United States Patent
Masuda et al.

(10) Patent No.: US 8,472,360 B2
(45) Date of Patent: Jun. 25, 2013

(54) MOBILE COMMUNICATION METHOD AND MOBILE STATION

(75) Inventors: Masafumi Masuda, Yokosuka (JP);
Takaaki Sato, Kawasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 266 days.

(21) Appl. No.: 12/742,784

(22) PCT Filed: Nov. 11, 2008

(86) PCT No.: PCT/JP2008/070507
§ 371 (c)(1),
(2), (4) Date: Aug. 16, 2010

(87) PCT Pub. No.: WO2009/063867
PCT Pub. Date: May 22, 2009

(65) Prior Publication Data
US 2010/0309802 A1 Dec. 9, 2010

(30) Foreign Application Priority Data
Nov. 13, 2007 (JP) ................................ 2007-294677

(51) Int. Cl.
*G08C 17/00* (2006.01)
(52) U.S. Cl.
USPC ........................................................ 370/311
(58) Field of Classification Search
USPC ......................................... 370/252, 311, 328
See application file for complete search history.

(56) References Cited

U.S. PATENT DOCUMENTS

| 6,067,460 A * | 5/2000 | Alanara et al. ............... 455/574 |
| 6,765,893 B1 * | 7/2004 | Bayley .......................... 370/335 |
| 2002/0137514 A1 * | 9/2002 | Mitsugi et al. ................ 455/436 |
| 2004/0203784 A1 * | 10/2004 | Sasaki et al. .................. 455/436 |

FOREIGN PATENT DOCUMENTS

| CN | 1414801 A | 4/2003 |
| JP | 7 231478 | 8/1995 |
| JP | 8 237184 | 9/1996 |
| JP | 9 187069 | 7/1997 |

OTHER PUBLICATIONS

Office Action issued Jun. 25, 2012 in Chinese Patent Application No. 200880115802.X (with English Translation).
Official Action issued on Aug. 28, 2012, in Japanese Application No. 2007-294677 w/English language translation.
Huawei, Cell re-selection for Hnb, R2-073159, 3GPP, Aug. 20, 2007, URL, http://www.3gpp.org/ftp/tsg_ran/WG2_RL2/TSGR2_59/Docs/R2-073159.zip (in English language only).

(Continued)

*Primary Examiner* — Mark Rinehart
*Assistant Examiner* — Mohammad Anwar
(74) *Attorney, Agent, or Firm* — Oblon, Spivak, McClelland, Maier & Neustadt, L.L.P.

(57) ABSTRACT

A mobile communication according to the present invention includes a step A of causing the mobile station to judge whether or not the mobile station is allowed to go into a standby mode in a cell corresponding to a predetermined pilot channel when the mobile station detects a predetermined operation made by a user and a step B of causing the mobile station to enter the standby in the cell when the mobile station judges that the mobile station is allowed to be in the standby mode in the cell.

10 Claims, 4 Drawing Sheets

OTHER PUBLICATIONS

Motorola, SCH identity assignment of CSG cells, R2-074438, 3GPP, Oct. 8, 2007, URL, http://www.3gpp.org.ftp/tsg_ran/WG2_RL2/TSGR2_59bis/Docs/R2-074438.zip (in English language only).

Vodafone, Telecom Italia, Mobility Management Identifiers in EPS Entities, C1-071669, 3GPP, Aug. 20, 2007, URL, http://www.3gpp.org/ftp/tsg_ct/WG1_mm-cc-sm_ex-CN1/TSGC1_48/Docs/C1-071669-EMM-identifiers.zip (in English language only).

* cited by examiner

MOBILE COMMUNICATION METHOD AND MOBILE STATION

TECHNICAL FIELD

The present invention relates to a mobile communication method with which a mobile station determines a cell in which the mobile station goes into a standby mode, by using a pilot channel, and relates to the mobile station.

BACKGROUND ART

In recent years, 3GPP (3rd Generation Partnership Projects) has specified a mobile communication system called a "W-CDMA (Wideband-Code Division Multiple Access) system (or UMTS: Universal Mobile Telecommunications System)" based on CDMA (Code Division Multiple Access) techniques.

FIG. 1 shows a configuration example of the W-CDMA system. As shown in FIG. 1, the W-CDMA system includes a mobile station UE (User Equipment), a radio base station NodeB, a radio control station RNC (Radio Network Controller), and an exchange MSC/SGSN (Mobile Switching Center/Serving GPRS Support Node), thereby configuring a cellular mobile communication system.

Radio waves transmitted from the radio base station NodeB form an area called a "Cell" which serves as a control unit in the cellular system.

In the W-CDMA system, the mobile station UE in a state of not performing communication with its power turned on, i.e., in a standby mode of standing by in preparation for a calling operation by a user or a call receiving operation due to an incoming call, measures electric fields of pilot channels transmitted from the radio base station NodeB and thus autonomously selects an optimum pilot channel.

In the W-CDMA system, a pilot channel is specified by a combination of a frequency band and a spreading code called "Primary Scrambling Code" and is normally linked with a cell on a one-to-one basis.

Specifically, pilot channels which correspond to different channels are respectively provided with different combinations of frequency bands and spreading codes (nevertheless, since the number of combinations of the frequency bands and the spreading codes is limited, the same spreading code may be reused among radio base stations NodeB which are geographically distant from each other).

It conversely means that a cell which transmits a pilot channel having a different combination of a frequency band and a spreading code is a different cell.

For example, the mobile station UE is configured to autonomously select, as the optimum pilot channel, a pilot channel such as one having a characteristic that an electric field intensity or a SIR (signal to interference ratio: a ratio of an electric field intensity of a desired wave to an electric field intensity of an interference wave) is larger than those of others, and one having a characteristic that an electric field loss is smaller than those of others.

Here, the mobile station UE having selected the optimum pilot channel, i.e., the mobile station UE having selected the optimum cell, reads notification information of the cell and enters standing by in the cell.

The mobile station in a standby mode in the cell starts communication by accessing the radio base station NodeB covering the cell or the radio control station RNC to go into a communicating state.

Meanwhile, the mobile station UE in the communicating state measures the electric field intensity of the pilot channel and reports such measurement information to the radio control station RNC either regularly or on a certain opportunity based on a result of a periodical threshold judgment, for example.

Conceivable information as such measurement information is information including the electric field intensity, the SIR, the electric field loss, and the like, as similar to the measurement result in the above-described standby mode.

The radio control station RNC selects the optimum cell on the basis of the measurement information and then notifies the mobile station UE or the radio base station NodeB of the frequency band and the spreading code (such as Primary/Secondary Scrambling Code or Channelisation Code) of a communication channel usable in the cell. Thereby, communication between the mobile station UE and the radio base station NodeB takes place.

In addition, as the mobile station UE moves, the mobile station UE is allowed to change the cell in which the mobile station UE is to perform communication, in the course of communication (handover).

Incidentally, as a type of the radio base station NodeB, a micro radio base station has been progressively introduced in addition to a public radio base station. While the public radio base station covers an outdoor space, the micro radio base station mainly covers an indoor space.

Moreover, an "area-restricted service" has been studied. In the "area-restricted service," the micro radio base stations are provided in a place such as a home or a small office to minimize a coverage area or to employ an inexpensive IP line for home use for connection with the radio control station RNC. With the "area-restricted service," a private area (containing a single or plural cells) exclusive for a particular user is formed, where a billing system in the area is discriminated from a normal billing system or an additional function is provided exclusively to the area.

Even when the area-restricted service exclusively for a particular user is provided by the micro radio base stations as in the above case, the mobile station UE in the standby mode selects a cell based on the measurement of the electric field of the pilot channel while the mobile station UE in the communicating state determines a cell, in which the mobile station UE performs communication, with an instruction of the radio control station RNC based on the information on the measurement of the electric field of the pilot channel, as described previously.

For this reason, even located in a geographical vicinity of a micro radio base station, the mobile station UE in some cases stands by or performs communication in a cell formed by a radio base station NodeB in the surroundings and withholds standby or communication in a particular area formed by the micro radio base station, if the electric field intensity of the pilot channel transmitted by the radio base station NodeB in the surroundings is dominant.

As described above, the W-CDMA system according to the related art has a problem that, even when an area-restricted service exclusively for a particular user is provided in a particular area, the mobile station UE does not perform communication in the particular area depending on the condition on the electric field and thereby degrades a service performance.

DISCLOSURE OF THE INVENTION

Accordingly, the present invention has been made in view of the above-mentioned problem. An object of the present invention is to provide a mobile communication method and a mobile station, which enable improvement in service performance when an area-restricted service exclusively for a particular user is provided in a particular area by causing a mobile station UE to use communication in the particular area more frequently.

The first feature of the present invention relates to a mobile communication method with which a mobile station determines a cell in which the mobile station goes into a standby mode, by using a pilot channel. The method includes a step A of causing the mobile station to judge whether or not the mobile station is allowed to go into a standby mode in a cell corresponding to a predetermined pilot channel when the mobile station detects a predetermined operation made by a user and a step B of causing the mobile station to enter the standby in the cell when the mobile station judges that the mobile station is allowed to be in the standby mode in the cell.

In the first feature of the present invention, the predetermined pilot channel may be specified by at least one of a frequency band and a spreading code stored in the mobile station in advance.

In the first feature of the present invention, the predetermined operation made by the user may include any one of a pressing operation of a predetermined button and a setting change operation for the mobile station, the pressing operation and the setting change operation made by the user.

In the first feature of the present invention, the mobile communication method may include a step C of causing the mobile station to store a pilot channel in a particular cell as the predetermined pilot channel when the mobile station detects that a particular service is usable in the particular cell.

In the first feature of the present invention, in the step C, the mobile station may inquire of a network side device as to whether or not the particular service is usable in the particular cell, and detects whether or not the particular service is usable in the particular cell on the basis of a result to the inquiry from the network side device.

In the first feature of the present invention, in the step C, the mobile station may store at least one of a frequency band and a spreading code of the pilot channel in the particular cell as at least one of the frequency band and the spreading code of the predetermined pilot channel.

The second feature of the present invention relates to a mobile station configured to determine a cell in which the mobile station goes into a standby mode, by using a pilot channel. The mobile station includes a judgment unit configured to judge whether or not the mobile station is allowed to go into a standby mode in a cell corresponding to a predetermined pilot channel when a predetermined operation made by a user is detected and a standby processor configured to enter the standby in the cell when judgment is made that the mobile station is allowed to go into a standby mode in the cell.

In the second feature of the present invention, the predetermined pilot channel may be specified by at least one of a frequency band and a spreading code stored in the mobile station in advance.

In the second feature of the present invention, the predetermined operation made by the user may include any one of a pressing operation of a predetermined button and a setting change operation for the mobile station, the pressing operation and the setting change operation made by the user.

In the second feature of the present invention, the mobile station may include a storage unit configured to store a pilot channel in a particular cell as the predetermined pilot channel when detection is made that a particular service is usable in the particular cell.

In the second feature of the present invention, the mobile station may be configured to inquire of a network side device as to whether or not the particular service is usable in the particular cell, and to detect whether or not the particular service is usable in the particular cell on the basis of a result to the inquiry from the network side device.

In the second feature of the present invention, the storage unit may be configured to store at least one of a frequency band and a spreading code of the pilot channel in the particular cell as at least one of the frequency band and the spreading code of the predetermined pilot channel.

BEST MODES FOR CARRYING OUT THE INVENTION (Configuration of Mobile Communication System According to First Embodiment of the Present Invention)

A configuration of a mobile communication system according to a first embodiment of the present invention will be described with reference to FIG. 1 and FIG. 2.

Figure 1:
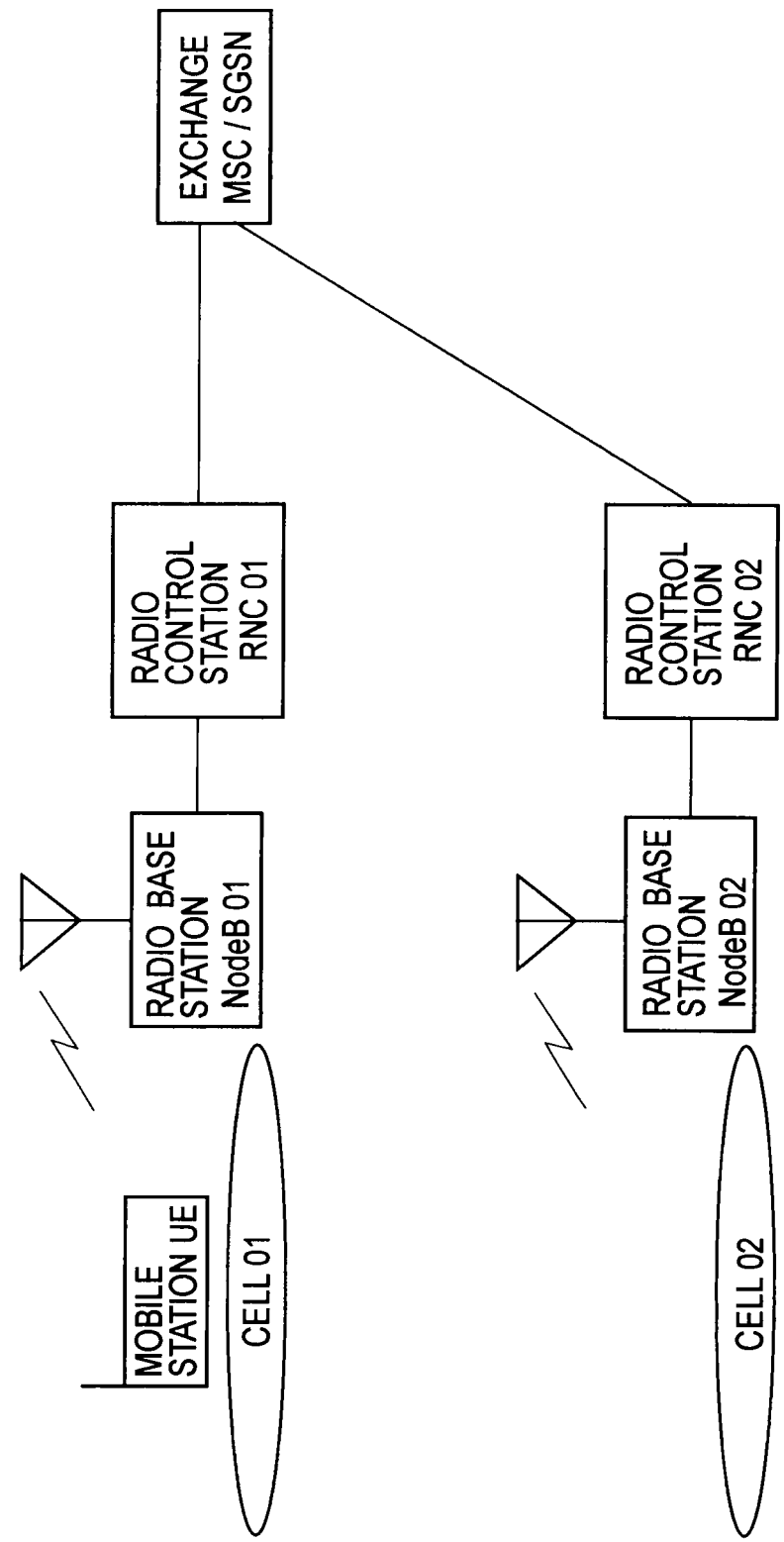
FIG. 1 is an overall configuration diagram of a mobile communication system according to a first embodiment of the present invention.

As shown in FIG. 1, the configuration of the mobile communication system according to the present embodiment is similar to the configuration of the above-described W-CDMA system.

Although it is general that the mobile communication system according to the present embodiment generally further includes other devices such as a home memory for storing subscriber information or a billing system, description and explanation thereof will be omitted in the present embodiment.

It is assumed here in the mobile communication system according to the present embodiment that an area-restricted service (a particular service) exclusive for a particular user is provided.

Here, the area-restricted service means a service to discriminate a billing system in a particular area for a particular user (a particular mobile station) from others or to provide the particular user with an area-restricted additional function.

For example, the area-restricted service a service in which a fixed charge is applied to communication inside a cell 01 by a particular user and a normal charge is applied to communication inside a public cell 02 due to a reason such as that the particular user installs and operates a micro radio base station which forms the cell 01 at the user's own expense.

Figure 2:
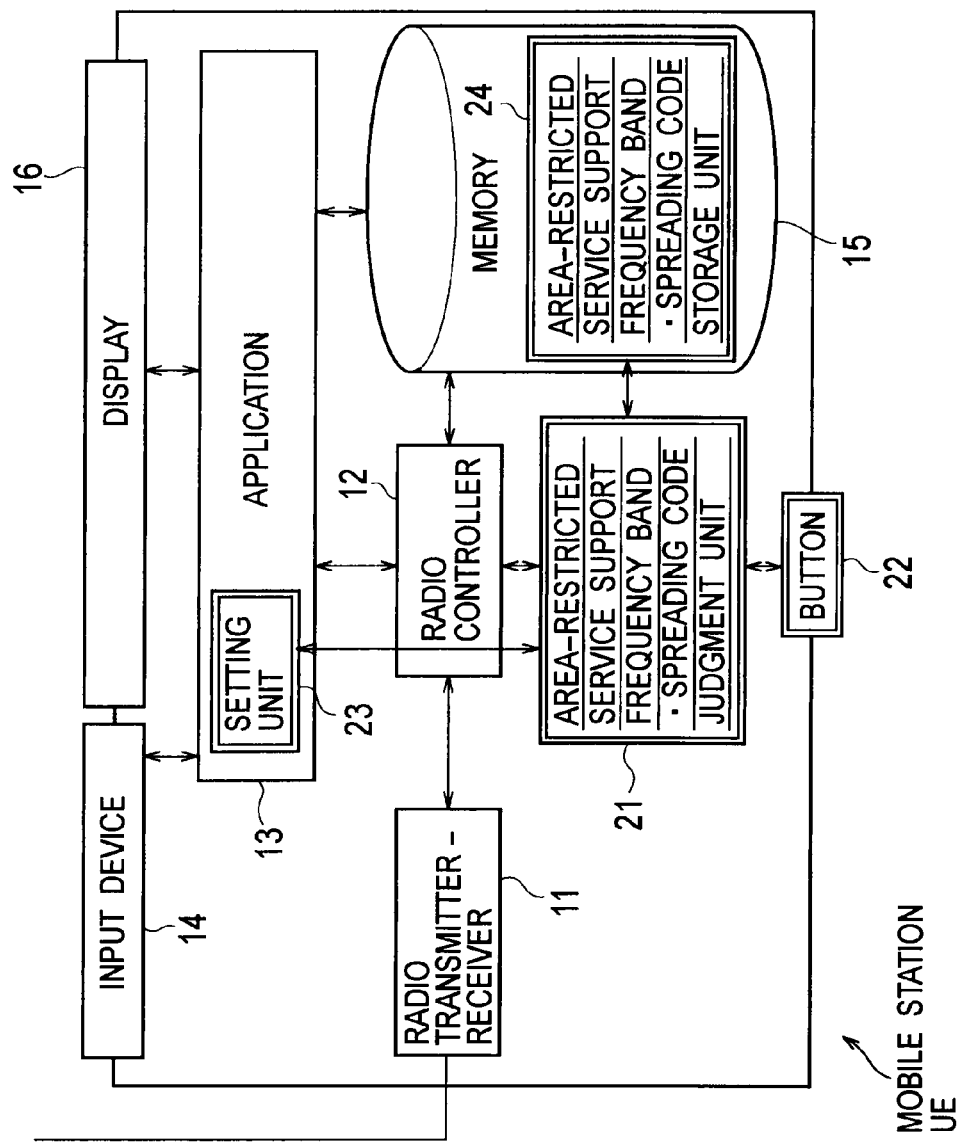
FIG. 2 is a functional block diagram of a mobile station according to the first embodiment of the present invention.

FIG. 2 shows an example of a configuration of a mobile station UE according to the present embodiment. The mobile station UE according to the present embodiment is configured to determine a cell in which the mobile station goes into a standby mode, by using a pilot channel.

In this description, "to go into a standby mode in a predetermined cell" maybe equivalent to go into an "idle state" in the predetermined cell or may be equivalent to go into a "CELL/URA_PCH state (a power-saving mode in which only a paging channel in the predetermined cell is monitored)" in the predetermined cell.

As shown in FIG. 2, in addition to usual mobile station functional units including a radio transmitter-receiver 11, a radio controller 12, an application 13, an input device 14, and a memory 15, the mobile station UE is provided with an area-restricted service support frequency band spreading code judgment unit 21, an area-restricted service support frequency band spreading code storage 24, and a setting unit 23, as characteristic functional units of the present embodiment.

The area-restricted service support frequency band spreading code judgment unit 21 is connected to the radio controller 12 and is provided with a function to judge whether a frequency band and a spreading code support an area-restricted service (a frequency band and a spreading code of a predetermined pilot channel).

Specifically, the area-restricted service support frequency band spreading code judgment unit 21 is configured to judge whether or not it is possible to go into a standby mode in a cell corresponding to a predetermined pilot channel when detecting a predetermined operation by a user.

Moreover, the area-restricted service support frequency band spreading code judgment unit 21 is connected to the setting unit 23 included in the application 16 and to a user operable button (a predetermined button) 22. By detecting a predetermined operation by the user, the area-restricted service support frequency band spreading code judgment unit 21 is able to provide a trigger for starting a judgment operation. Further, the area-restricted service support frequency band spreading code judgment unit 21 is also connected to the area-restricted service support frequency band spreading code storage unit 24 included in the memory 15 and is able to acquire the frequency band and the spreading code which support the area-restricted service.

Here, the predetermined pilot channel is specified by at least one of the frequency band and the spreading code stored in advance in the area-restricted service support frequency band spreading code storage unit 24 of the mobile station UE.

Meanwhile, a conceivable predetermined operation by the user is an operation such as a pressing operation of the predetermined button 22 by the user, a setting change operation for the mobile station UE using the setting unit 23 by the user, or the like.

In the meantime, the radio controller 12 is configured to enter the standby in the cell when the area-restricted service support frequency band spreading code judgment unit 21 judges that it is possible to go into a standby mode in the cell corresponding to the predetermined pilot channel.

Meanwhile, the area-restricted service support frequency band spreading code storage unit 24 is configured to store the pilot channel in the particular cell as the predetermined pilot channel when having detected that the particular service is usable in a particular cell.

Here, the area-restricted service support frequency band spreading code storage unit 24 may be configured to inquire of a network side device (such as a radio base station NodeB, a radio control station RNC, or an exchange MSC/SGSN) as to whether or not the particular service is usable in the particular cell, and to detect as to whether or not the particular service is usable in the particular cell on the basis of a result to the inquiry from the network side device.

Alternatively, the area-restricted service support frequency band spreading code storage unit 24 may be configured to store information on the particular area in which the particular service is usable and to detect as to whether or not the particular service is usable in the particular cell on the basis of the information.

Here, the area-restricted service support frequency band spreading code storage unit 24 is configured to store at least one of the frequency band and the spreading code of the pilot channel in the particular cell as at least one of the frequency band and the spreading code of the predetermined pilot channel (the frequency band and the spreading code which support the area-restricted service).

(Operations of Mobile Communication System According to First Embodiment of the Present Invention)

Operations of the mobile communication system according to the first embodiment of the present invention will be described with reference to FIG. 3 and FIG. 4.

First, an operation of the mobile station UE in the standby mode according to the first embodiment of the present invention will be described with reference to FIG. 3.

Figure 3:
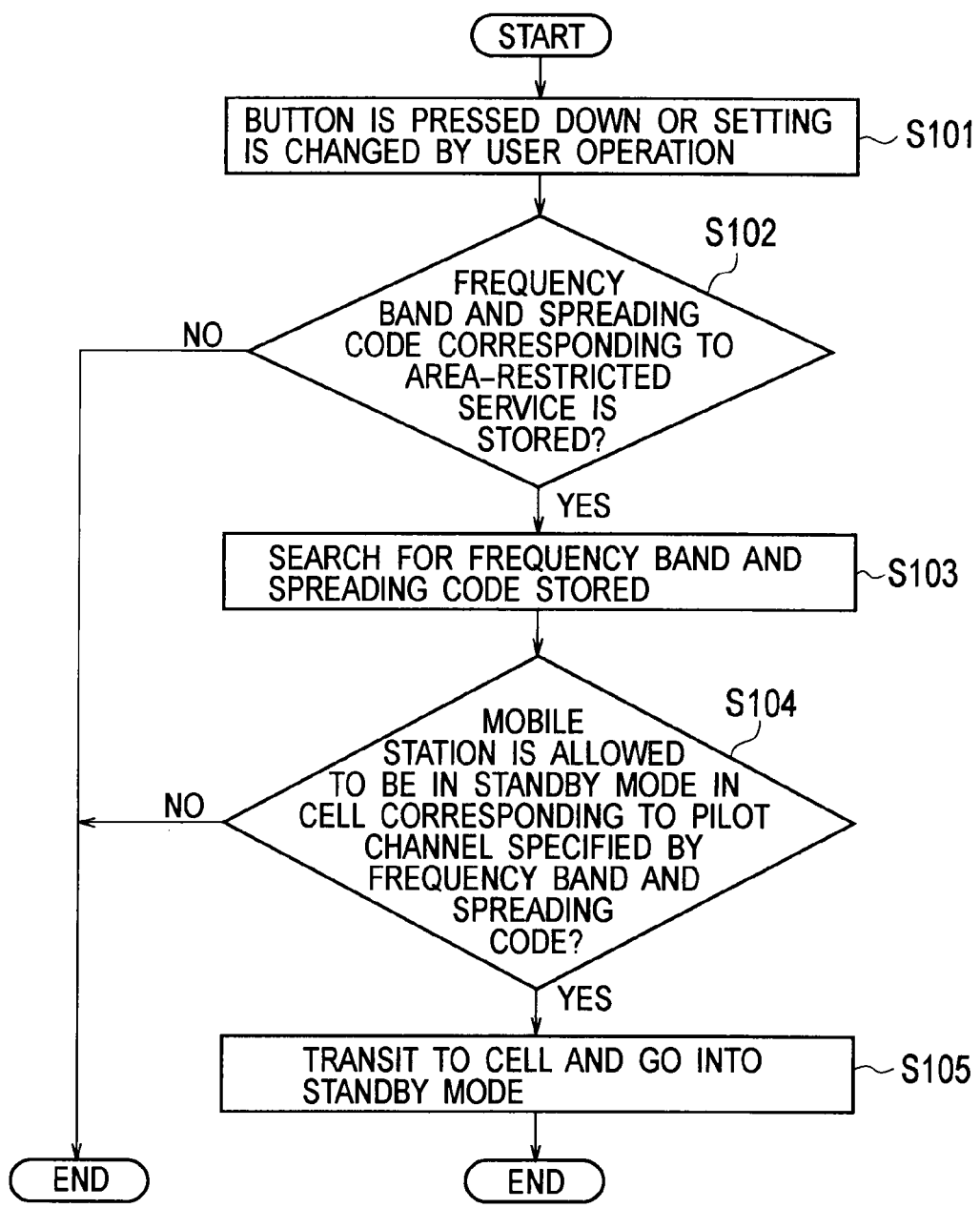
FIG. 3 is a flowchart showing an operation of the mobile station according to the first embodiment of the present invention.

As shown in FIG. 3, in step S101, the mobile station UE standing by in a first cell detects that the predetermined button 22 mounted on the mobile station UE is pressed down by a user or detects a trigger in which the predetermined operation by the user is detected, the trigger being a case of detecting that predetermined setting of the mobile station is changed by the setting unit 23 mounted on the mobile station UE and the like. Upon the detection, the mobile station UE judges whether or not the combination of the frequency band and the spreading code corresponding to the area-restricted service is stored in the own area-restricted service support frequency band spreading code storage unit 24 in step S102.

The operation is terminated if the combination is not stored and the mobile station UE returns to the standby mode in the first cell.

On the other hand, when the combination is stored, the mobile station UE searches for the combination of the frequency band and the spreading code in step S103. Specifically, the mobile station UE attempts to detect a synchronization point by performing correlation detection regarding the spreading code in the frequency band.

Subsequently, in step S104, the mobile station UE detects the synchronization point and performs judgment as to whether or not it is possible to go into a standby mode in the cell corresponding to the predetermined pilot channel which is specified by the combination of the frequency band and the spreading code.

The operation is terminated when it is not possible to go into a standby mode and the mobile station UE returns to the standby mode in the first cell.

On the other hand, when it is possible to go into a standby mode, the mobile station UE goes into the standby mode in the cell corresponding to the predetermined pilot channel, and thus the operation is terminated.

For example, assume in FIG. 1, that the mobile station UE is able to enjoy the area-restricted service (the particular service) restricted in the cell 01 but unable to enjoy the area-restricted service in the cell 02.

In this case, when the predetermined button 22 is pressed by the user or when the setting of the mobile station UE is changed while the mobile station UE is standing by in the cell 02, the mobile station UE searches for the frequency band and the spreading code for specifying the pilot channel (the predetermined pilot channel) of the cell 01 stored in advance and transits to the standby mode in the cell 01 as shown in FIG. 3.

Here, the mobile station UE which cannot enjoy the area-restricted service in the standby mode in the cell 02 becomes able to enjoy the area-restricted service by transiting to the standby mode in the cell 01 by the operation shown in FIG. 3.

As to means by which the mobile station UE stores the frequency range and the spreading code, the user only has to write and retain the frequency band and the spreading code in the memory 15 of the mobile station UE by using a device which can access to the memory 15 of the mobile station UE when signing up for the area-restricted service.

For example, when the user signs up for a fixed charging service in the cell 01, the user only has to write the frequency band and the spreading code for specifying the pilot channel (the predetermined pilot channel) of the cell 01 into the memory 15 of the mobile station UE.

Meanwhile, the mobile station UE can also write the predetermined pilot channel into the own memory 15 automatically depending on availability of the area-restricted service.

Second, an operation of the mobile station UE according to the present embodiment to store the predetermined pilot channel will be described with reference to FIG. 4.

Figure 4:
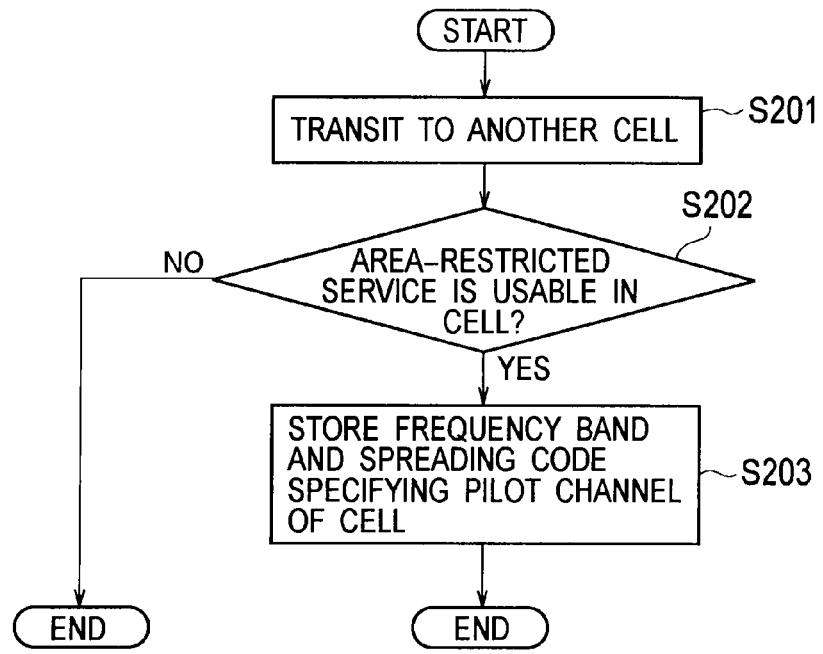
FIG. 4 is a flowchart showing an operation of the mobile station according to the first embodiment of the present invention.

As shown in FIG. 4, when the mobile station UE detects that the cell which the mobile station UE is standing by is changed due to transition of the cell in step S201, the mobile station UE judges whether or not the area-restricted service (the particular service) is usable in a cell of a transition destination in step S202.

One of conceivable methods as such a judgment method is a method of accessing the exchange MSC/SGSN through the radio base station NodeB and making reference to contract information written in the home memory is conceivable, for example.

The operation is terminated when judgment is made that the area-restricted service (the particular service) is not usable in the cell of the transition destination, and the mobile station UE goes into the standby mode in the cell of the transition destination.

On the other hand, when judgment is made that the area-restricted service (the particular service) is usable in the cell of the transition destination, the mobile station UE stores the combination of the frequency band and the spreading code for specifying the pilot channel of the cell of the transition destination in the own memory 15 or the like in step S203. Then, the operation is terminated and the mobile station UE goes into the standby mode in the cell of the transition destination.

For example, assume in FIG. 1, that the mobile station UE is able to enjoy the area-restricted service (the particular service) restricted in the cell 01 but unable to enjoy the area-restricted service in the cell 02.

In this case, when the mobile station UE transits into a range of the cell 01, the mobile station UE stores the combination of the frequency band and the spreading code for specifying the pilot channel corresponding to the cell 01 by the operation shown in FIG. 4.

Thereafter, even after transiting into a range of the cell 02, the mobile station UE goes into the standby mode in cell 01 by the operation shown in FIG. 3 and is allowed to enjoy the area-restricted service.

(Advantageous Effects of Mobile Communication System According to First Embodiment of the Present Invention)

According to the mobile communication system of the first embodiment of the present invention, when the area-restricted service exclusive for the particular user is provided in the particular area, the mobile station UE performs communication in the particular area more frequently, thereby improving a service performance.

Moreover, according to the mobile communication system of the first embodiment of the present invention, it is not necessary to write the information in the mobile station UE in advance as the mobile station UE stores the information automatically. This enables improvement in user-friendliness and cost reduction for a provider.

(A Mobile Communication System According To Second Embodiment of the Present Invention)

It is to be noted that the present invention is not limited only to the application to the W-CDMA system as described above in the first embodiment but is also applicable to a mobile communication system of any method used by a mobile station to determine a cell in which a mobile station goes into a standby mode by using a pilot channel.

Figure 5:
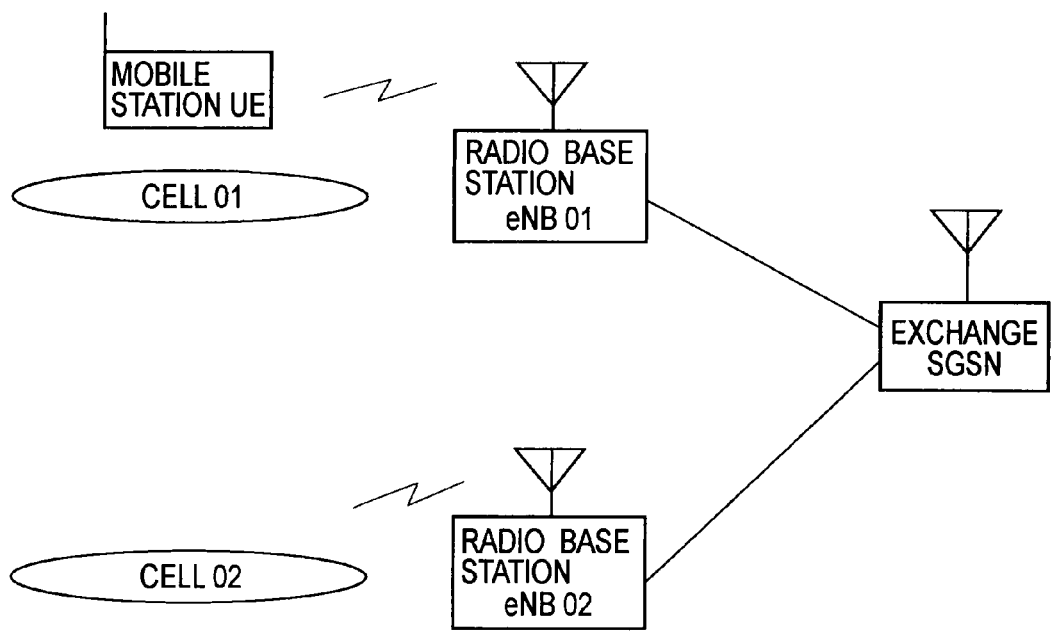
FIG. 5 is an overall configuration diagram of a mobile communication system according to a second embodiment of the present invention.

For example, the present invention is also applicable to a mobile communication system of a "LTE (Long Term Evolution)" method such as a mobile communication system according to a second embodiment of the present invention shown in FIG. 5.

As shown in FIG. 5, the mobile communication system according to the present embodiment includes a mobile station UE, a radio base station eNB, and a packet exchange SGSN (Serving GPRS Support Node), the radio base station eNB provided with a MAC (Media Access Control) function, a RLC (Radio Link Control) function, an RRC (Radio Resource Control) function, and so forth.

Here, the configuration of the mobile station UE according to the present embodiment is the same as the configuration of the mobile station UE according to the above-described first embodiment.

Note that the operation of the radio control station RNC 10, the mobile station UE, the radio base station NodeB, eNB and the exchange MSC/SGSN, SGSN may be implemented by hardware, may be implemented by a software module that is executed by a processor, or may be implemented by combination of both.

The software module may be provided in any form of storage media including a RAM (Random Access Memory), a flash memory, a ROM (Read Only Memory), an EPROM (Erasable Programmable ROM), an EEPROM (Electronically Erasable and Programmable ROM), a register, a hard disc, a removable disc, and a CD-ROM.

Such a storage medium is connected to the processor so as to allow the processor to read or write information from or to the storage medium. Alternatively, the storage medium may be integrated in a processor. Furthermore, the storage medium and the processor may be provided in ASIC. The ASIC may be provided in the mobile station UE and the radio base station eNB. Instead, the storage medium and the processor may be provided in the mobile station UE and the radio base station eNB as discrete components.

As has been described so far, the present invention has been described in detail using the embodiment. However, it is apparent for those skilled in the art that the present invention is not limited to the embodiment described herein. The present invention can be implemented as modifications and alternative embodiments without departing from the gist and scope of the present invention defined by the description of the scope of claims. Accordingly, the description herein is intended only for an exemplary purpose and has no intention to limit the present invention.

Note that the entire content of Japanese Patent Application No. 2007-294677 (filed on Nov. 13, 2007) is incorporated herein by reference.

Industrial Applicability

As has been described, since the present invention is able to provide a mobile communication method and a mobile station, which enable improvement in service performance when an area-restricted service exclusively for a particular user is provided in a particular area by causing a mobile station UE to use communication in the particular area more frequently, they are useful.

The invention claimed is:

1. A mobile communication method with which a mobile station determines a cell in which the mobile station goes into a standby mode, by using a pilot channel, comprising:
   detecting reception of a predetermined operation by a user;
   in response to receiving the predetermined operation by the user, determining whether a combination of a frequency band and spreading code corresponding to a predetermined pilot channel for a particular cell that provides area-restricted services is previously stored;
   detecting the combination of the frequency band and spreading code in response to determining that the frequency band and spreading code are previously stored;
   causing the mobile station to judge whether or not the mobile station is allowed to go into the standby mode in the particular cell based on the detection of the combination of the frequency band and spreading code; and
   causing the mobile station to enter the standby mode in the particular cell when the mobile station judges that the mobile station is allowed to be in the standby mode in the particular cell.

2. The mobile communication method according to claim 1, wherein the predetermined operation made by the user includes any one of a pressing operation of a predetermined button and a setting change operation for the mobile station, the pressing operation and the setting change operation made by the user.

3. The mobile communication method according to claim 1, comprising a step of causing the mobile station to store a pilot channel in a particular cell as the predetermined pilot channel when the mobile station detects that a particular service is usable in the particular cell.

4. The mobile communication method according to claim 3, wherein, the mobile station inquires of a network side device as to whether or not the particular service is usable in the particular cell, and detects whether or not the particular service is usable in the particular cell on the basis of a result to the inquiry from the network side device.

5. The mobile communication method according to claim 3, wherein, the mobile station stores at least one of a frequency band and a spreading code of the pilot channel in the particular cell as at least one of the frequency band and the spreading code of the predetermined pilot channel.

6. A mobile station configured to determine a cell in which the mobile station goes into a standby mode, by using a pilot channel, comprising:
   a reception unit configured to receive a predetermined operation by a user;
   a storage unit configured to store a combination of a frequency band and spreading code corresponding to a predetermined pilot channel for a particular cell that provides area-restricted services;
   a judgment unit configured to determine, in response to receiving the predetermined operation by the user, whether the combination of the frequency band and spreading code is previously stored in the storage unit, detect the combination of the frequency band and spreading code in response to determining that the frequency band and spreading code are previously stored in the storage unit, and judge whether or not the mobile station is allowed to go into the standby mode in the particular cell based on the detection of the combination of the frequency band and spreading code; and
   a standby processor configured to enter the standby mode in the particular cell when judgment is made that the mobile station is allowed to go into the standby mode in the particular cell.

7. The mobile station according to claim 6, wherein the predetermined operation made by the user includes any one of a pressing operation of a predetermined button and a setting change operation for the mobile station, the pressing operation and the setting change operation made by the user.

8. The mobile station according to claim 6, further comprising: a storage unit configured to store a pilot channel in a particular cell as the predetermined pilot channel when detection is made that a particular service is usable in the particular cell.

9. The mobile station according to claim 8, wherein the mobile station is configured to inquire of a network side device as to whether or not the particular service is usable in the particular cell, and to detect whether or not the particular service is usable in the particular cell on the basis of a result to the inquiry from the network side device.

10. The mobile station according to claim 8, wherein the storage unit is configured to store at least one of a frequency band and a spreading code of the pilot channel in the particular cell as at least one of the frequency band and the spreading code of the predetermined pilot channel.

* * * * *